A. A. BEEKS.
BRUSH.
APPLICATION FILED APR. 25, 1914.

1,118,838.

Patented Nov. 24, 1914.

Witnesses
Fred J. Seidenberg

Inventor
Alice A. Beeks.
By Victor J. Evans
Attorney

UNITED STATES PATENT OFFICE.

ALICE A. BEEKS, OF OCHEYEDAN, IOWA.

BRUSH.

1,118,838. Specification of Letters Patent. Patented Nov. 24, 1914.

Application filed April 25, 1914. Serial No. 834,472.

*To all whom it may concern:*

Be it known that I, ALICE A. BEEKS, a citizen of the United States, residing at Ocheyedan, in the county of Osceola and State of Iowa, have invented new and useful Improvements in Brushes, of which the following is a specification.

The invention relates to brushes, and has for an object to provide a simple and effective brush which is particularly adaptable for use on receptacles such as fruit jars and the like, and which it is desired to thoroughly cleanse or sterilize.

The invention contemplates, among other features, the provision of a brush which is adapted to be used in connection with fruit jars or other receptacles having a depth which prevents the operator from advancing his hand into the receptacle and thoroughly cleansing the same with a wash cloth or the like, and to this end the brush contemplates the provision of a spring-like member carrying a brush body and which can be suitably inserted in the receptacle and then be manually rotated to clean the interior thereof.

Figure 1:
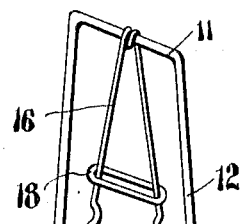
Figure 2:
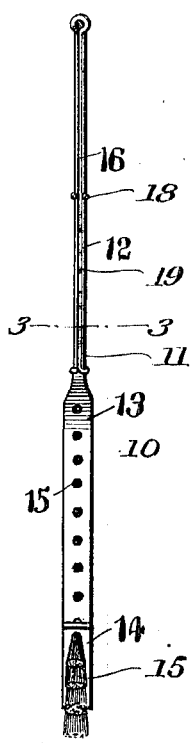
Figure 4:
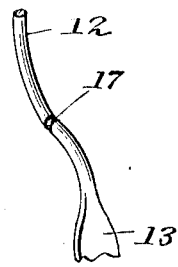
Figure 3:
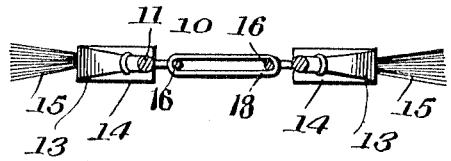

In the further disclosure of the invention reference is to be had to the accompanying drawings, constituting a part of this specification, in which similar characters of reference denote corresponding parts in all the views, and in which:

Figure 1 is a perspective view of the brush; Fig. 2 is a vertical sectional view taken through the brush; and Fig. 3 is a horizontal sectional view taken on the line 3—3 in Fig. 2. Fig. 4 is a fragmentary perspective view of one of the side members, showing the notch therein.

Referring more particularly to the views, I disclose a brush 10 which consists of a spring-like frame 11 preferably formed of a single piece of stout wire bent at its medial portion in a U-shaped form to provide a handle 12 and having depending side portions 13 bent upwardly and inwardly at their lower ends 14. The side portions 13 and ends 14 support a brush body 15 preferably made of stout bristles and a member 16 in the nature of a wire has its medial portion looped around and encircling the handle 12 at its medial portion, with the ends of the wire extending downwardly and diverging so that their extremities can be looped around and secured to the side portions 13 near their upper ends, suitable notches 17 being formed in the side members to permit of rigidly securing the ends of the member 16 thereto. A slide 18 is arranged to slide thereto. upon the member 16 and encircles the side portions of the wire forming the member, said slide 18 being also preferably made of a single piece of wire and adapted to be normally held in notches 19 formed in the side portions of the member 16 and whereby the slide 18 can be adjusted on the member 16.

In the use of the device the slide 18 is first advanced along the member 16, thus causing the side portions 13 of the frame to move together against the spring-like action of the frame to permit of inserting the brush body through the usual restricted mouth of the receptacle or jar. The slide can then be moved upwardly on the member 16, thus causing the side portions to spread apart so that the brush body will engage and operate over the inner surface of the jar and clean the same when a rotary movement is imparted to the brush by grasping and turning the handle 12. The ends 14 are also covered with a portion of the brush body 15 and will tend to clean the bottom of the jar on its inner face and it will be understood that if desirable the slide 18 can be arranged to freely slide upon the member 16, this being accomplished by dispensing with the notches 19 thereof.

From the foregoing description it will be seen that a brush of a simple construction is provided and which can be cheaply manufactured to perform the desired result.

The brush will constitute a valuable asset to the housekeeper and is particularly adaptable for use in cleaning fruit jars or other similar receptacles whose mouths are too restricted to permit of inserting the hand therein and which are of a depth which will prevent the insertion of a cloth into the jar for the purpose of cleaning the same.

Having thus described my invention, I claim:

1. In a brush, the combination with a frame formed of a single piece of material havings its medial portion bent in a U-shape to provide a handle including side portions terminating in upwardly and inwardly projecting ends, a brush member on the side portions and ends of the frame, said frame being formed of spring-like material whereby the side portions will tend to normally move apart, a member connected to the handle and side portions of the frame and consisting of a single piece of wire-like material looped around the handle and having its extremities secured to the side portions of the frame so that the side portions of the member will relatively diverge toward its ends, and a slide on the said member and adjustable thereon to move the said side portions of the frame together.

2. In a brush, the combination with a spring-like frame of a substantially U-shape, of a handle formed with the frame, a brush body on the frame, a member on the frame and having diverging side portions provided with a series of notches, and a slide encircling the diverging side portions of the member and adapted to be advanced thereon to move the free ends of the frame toward each other, said slide being held in an adjusted position on the said member by the notches therein.

In testimony whereof I affix my signature in presence of two witnesses.

ALICE A. BEEKS.

Witnesses:
W. W. UMLAND,
W. J. LINDAMAN.

Copies of this patent may be obtained for five cents each, by addressing the "Commissioner of Patents, Washington, D. C."